(12) United States Patent
Song et al.

(10) Patent No.: US 9,337,882 B2
(45) Date of Patent: May 10, 2016

(54) MOBILE TERMINAL

(71) Applicant: LG Electronics Inc., Seoul (KR)

(72) Inventors: Insu Song, Seoul (KR); Yunsung Lee, Seoul (KR); Hyoungwook Lim, Seoul (KR); Youngmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 5 days.

(21) Appl. No.: 13/907,189

(22) Filed: May 31, 2013

(65) Prior Publication Data

US 2014/0031093 A1 Jan. 30, 2014

(30) Foreign Application Priority Data

Jul. 27, 2012 (KR) .......................... 10-2012-0082724

(51) Int. Cl.
*H04M 1/00* (2006.01)
*H04B 1/3888* (2015.01)
*H04M 1/02* (2006.01)
*G06F 1/16* (2006.01)

(52) U.S. Cl.
CPC ............ *H04B 1/3888* (2013.01); *G06F 1/1626* (2013.01); *H04M 1/0249* (2013.01); *H04M 1/0254* (2013.01)

(58) Field of Classification Search
CPC ..... H04B 1/3888; G06F 1/1613; G06F 1/643; G06F 1/1626; H02K 33/18; H04M 1/0254
USPC .................... 361/600, 679.02, 679.3, 679.55, 361/679.56; 455/575.1, 575.9, 575.4, 90.3; 379/433.01, 433.12
See application file for complete search history.

(56) References Cited

U.S. PATENT DOCUMENTS

| 5,883,787 | A  | * | 3/1999  | Reier ............................ 361/752 |
| 7,837,484 | B2 | * | 11/2010 | Wu ....................... H01R 13/447 439/136 |
| 7,957,123 | B2 | * | 6/2011  | Horii ................... H04M 1/0249 206/320 |
| 8,090,408 | B2 | * | 1/2012  | Ochi et al. ..................... 455/558 |
| 8,120,539 | B2 | * | 2/2012  | Hong .................. H01Q 1/1207 343/702 |
| 8,218,324 | B2 | * | 7/2012  | Jones ................... H05K 5/0021 361/752 |
| 8,385,075 | B2 | * | 2/2013  | Loucks ................. G06F 1/1626 361/728 |
| 8,780,537 | B2 | * | 7/2014  | Sokola .................. G06F 1/1626 361/679.01 |
| 2004/0240162 | A1 | * | 12/2004 | Hsu ...................... H01H 23/145 361/679.13 |
| 2006/0223548 | A1 | * | 10/2006 | Tse ................... H04M 1/72541 455/456.1 |
| 2008/0067715 | A1 | * | 3/2008  | Sung ................ B29C 45/14811 264/279 |
| 2009/0061928 | A1 | * | 3/2009  | Lee et al. .................... 455/556.1 |
| 2010/0137043 | A1 |   | 6/2010  | Horimoto et al. |

(Continued)

FOREIGN PATENT DOCUMENTS

CN 102474287 A 5/2012

*Primary Examiner* — Mahendra Patel
(74) *Attorney, Agent, or Firm* — Birch, Stewart, Kolasch & Birch, LLP

(57) ABSTRACT

A mobile terminal is provided. The mobile terminal includes a case defining an appearance of a terminal body of the mobile terminal, the case including a mounting groove recessed from one surface of the case, a frame coupled to the case at the mounting groove, the frame being arranged to cover at least one side surface of the terminal body and at least one signal input module coupled to the frame, the signal input module being configured to generate a signal in response to a user input.

13 Claims, 12 Drawing Sheets

(56) References Cited

U.S. PATENT DOCUMENTS

| | | | |
|---|---|---|---|
| 2010/0149069 A1* | 6/2010 | Kim | H01Q 1/243 343/904 |
| 2010/0271270 A1* | 10/2010 | Sung | B29C 45/14065 343/702 |
| 2011/0273819 A1 | 11/2011 | Sokola et al. | |
| 2012/0039050 A1* | 2/2012 | Chang | B29C 45/1671 361/749 |
| 2012/0113012 A1 | 5/2012 | Cho et al. | |
| 2012/0115551 A1 | 5/2012 | Cho et al. | |
| 2014/0001889 A1* | 1/2014 | Hong | 310/25 |

* cited by examiner

MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0082724, filed on Jul. 27, 2012, the contents of which is incorporated by reference herein in its entirety.

BACKGROUND OF THE INVENTION

1. Field of the Invention

The present disclosure relates to a mobile terminal, and particularly, to a case which forms the appearance of a mobile terminal.

2. Description of Related Art

As a mobile terminal becomes multifunctional, the mobile terminal can be allowed to capture still images or moving images, play music or video files, play games, receive broadcast, etc., so as to be implemented as an integrated multimedia player.

Terminals can be divided into mobile/portable terminals and stationary terminals according to their mobility. The mobile terminal is a portable device that can be carried anywhere and have one or more of a function of performing voice and video calls, a function of inputting/outputting information, a function of storing data, etc.

In order to support and enhance such functions of the terminal, it can be considered to improve the configuration and/or software of the terminal.

The mobile terminal has a case consisting of a front case and a rear case, and the appearance of the mobile terminal is implemented as the front case and the rear case are coupled to each other.

A signal input means is coupled to the case so as to extend the function of the mobile terminal, and an external connection means such as an interface is formed at the case. The mobile terminal requires a margin space due to a gap between the components and the case. This may cause a difficulty in forming the mobile terminal in a small size. Further, due to an increased number of assembly processes, the productivity of the mobile terminal may be lowered.

BRIEF SUMMARY OF THE INVENTION

Therefore, an aspect of the detailed description is to provide a mobile terminal having an appearance differentiated from the conventional one.

Another aspect of the detailed description is to provide a case of a mobile terminal having a more enhanced structure and an integrated function.

To achieve these and other advantages and in accordance with the purpose of this specification, as embodied and broadly described herein, there is provided a mobile terminal, comprising: a case which forms appearance of a terminal body; a frame coupled to the case so as to cover at least one side surface of the terminal body; and a signal input module coupled to the frame, and configured to generate a signal according to a user's input, wherein the case is provided with mounting grooves recessed from one surface of the case so as to couple the frame thereto.

According to an embodiment of the present invention, the frame or the mounting groove may be provided with a hook or a locking portion through which the frame and the mounting groove are coupled to each other.

According to an embodiment of the present invention, the frame may be provided with an accommodation portion for accommodating the signal input module, and the accommodation portion may be coupled to the mounting groove to thus be supported.

According to an embodiment of the present invention, the signal input module may include a key having an actuator on a rear surface thereof; and a flexible printed circuit board having a dome on one surface thereof, the dome configured to generate a signal as the actuator is pressed.

According to an embodiment of the present invention, the signal input module may further include a supporting member having a first surface for supporting the flexible printed circuit board, and a second surface formed to contact the accommodation portion.

According to an embodiment of the present invention, the flexible printed circuit board may be electrically connected to a circuit board mounted in the terminal body.

According to an embodiment of the present invention, the accommodation portion may further include coupling members having a shape corresponding to protrusions formed at two ends of the key, and configured to couple the protrusions.

According to an embodiment of the present invention, the frame may be configured to cover at least two side surfaces among an upper surface, a lower surface, a left surface and a right surface of the terminal body, and the frame may have a consecutive structure for covering the side surfaces of the terminal body.

According to an embodiment of the present invention, a socket for connection with an external device may be provided in the terminal body, and the frame may be provided with a slot portion communicated with the socket.

According to an embodiment of the present invention, the frame may further include a slide door coupled to the slot portion, and slid so as to open and close the socket.

According to an embodiment of the present invention, the case may be composed of a front case and a rear case, and the mounting groove may be formed at the front case.

According to an embodiment of the present invention, the frame may be provided with a through hole which allows a screw to pass therethrough, and the screw may be coupled to the rear case through the mounting groove.

According to an embodiment of the present invention, the frame may include a screw hole, and the frame may be coupled to a supporting plate formed between the front case and the rear case, using a screw.

According to an embodiment of the present invention, the frame may be provided with at least one fixing portion, and the fixing portion may be coupled to the rear case through the mounting groove.

According to an embodiment of the present invention, the frame may include a fixing portion having a screw hole, and the frame may be coupled to a supporting plate formed between the front case and the rear case, using a screw.

According to an embodiment of the present invention, the frame may be formed of a conductive member so as to operate as a radiator of an antenna.

According to an embodiment of the present invention, the frame and the signal input module may be assembled to each other, and then the assembly may be coupled to the case.

According to an embodiment of the present invention, one of the case and the frame may be formed of a conductive member, and another may be formed of a non-conductive member.

According to an embodiment of the present invention, a buffer may be formed on at least part of the frame which covers the terminal body.

The mobile terminal according to at least one embodiment of the present invention may have the following advantages.

Firstly, the signal input module may be coupled to the frame, and the frame integrated with the signal input module may be coupled to the case. Under such configuration, a plurality of components formed on the side surface of the terminal body can be integrated with the frame. This can simplify the assembly process.

Secondly, the strength of the mobile terminal can be enhanced by the frame, and the mobile terminal can have a more compact structure because a number of components formed on the side surface of the terminal body are integrated with the frame.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. Singular expressions include plural expressions which do not have any obviously different meaning in view of a context.

The mobile terminal according to the present invention may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
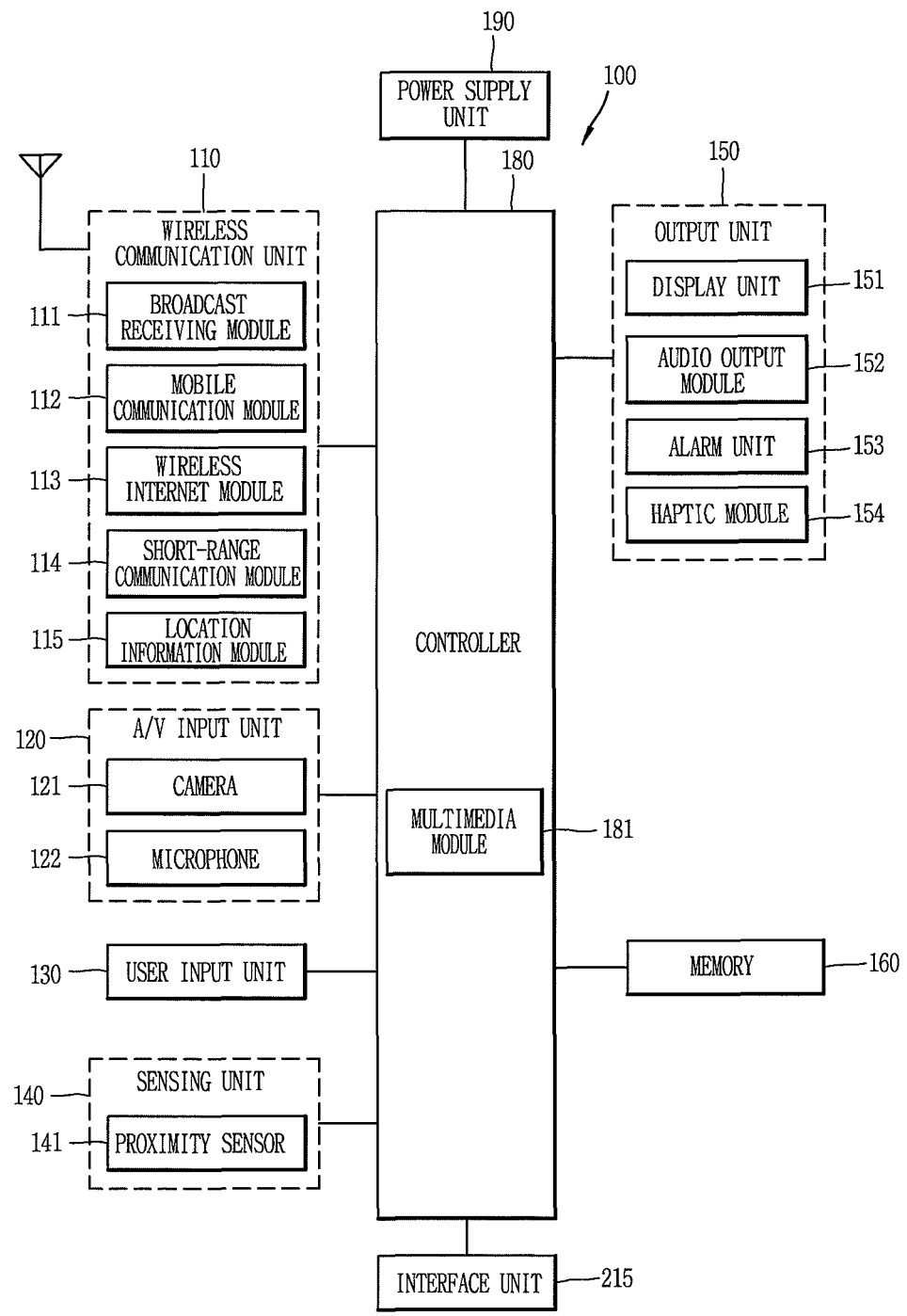
FIG. 1 is a block diagram of a mobile terminal according to an embodiment of the present invention.

The mobile terminal 100 may comprise components, such as a wireless communication unit 110, an Audio/Video (A/V) input unit 120, a user input unit 130, a sensing unit 140, an output unitlocation information 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a location information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the location information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image frames such as still images or moving images acquired by an image sensor in a video call mode or an image capturing mode. The processed image frames may be displayed on a display unit 151.

The image frames processed by the camera 121 may be stored in the memory 160 or transmitted to the outside via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated while receiving and transmitting audio signals.

The user input unit 130 may generate input data for allowing a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, or a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, capacitance type proximity sensor, a magnetic type proximity sensor, an infrared rays proximity sensor, and so on. When the touch screen is implemented as capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses a proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
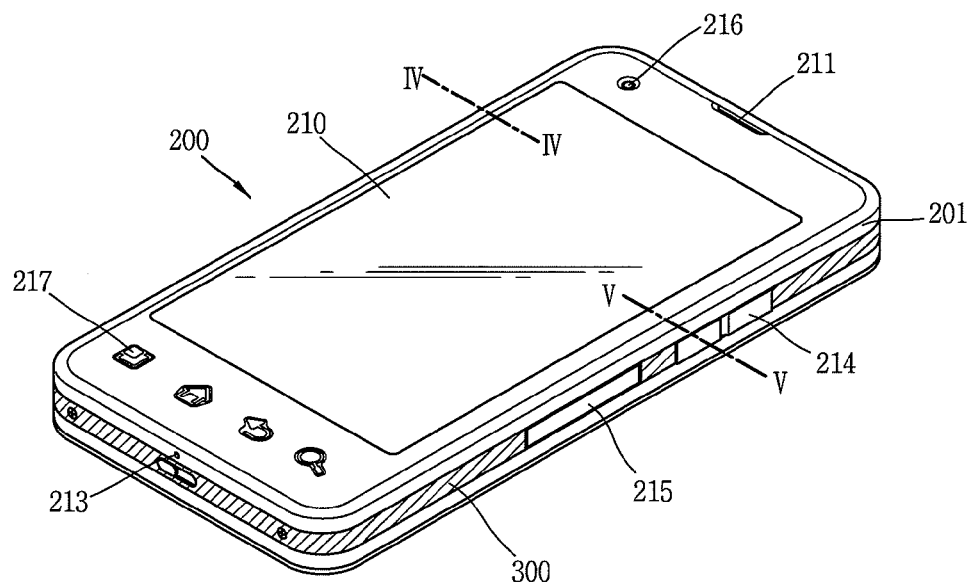
FIG. 2 is a front perspective view of a mobile terminal according to an embodiment of the present invention.
Figure 3:
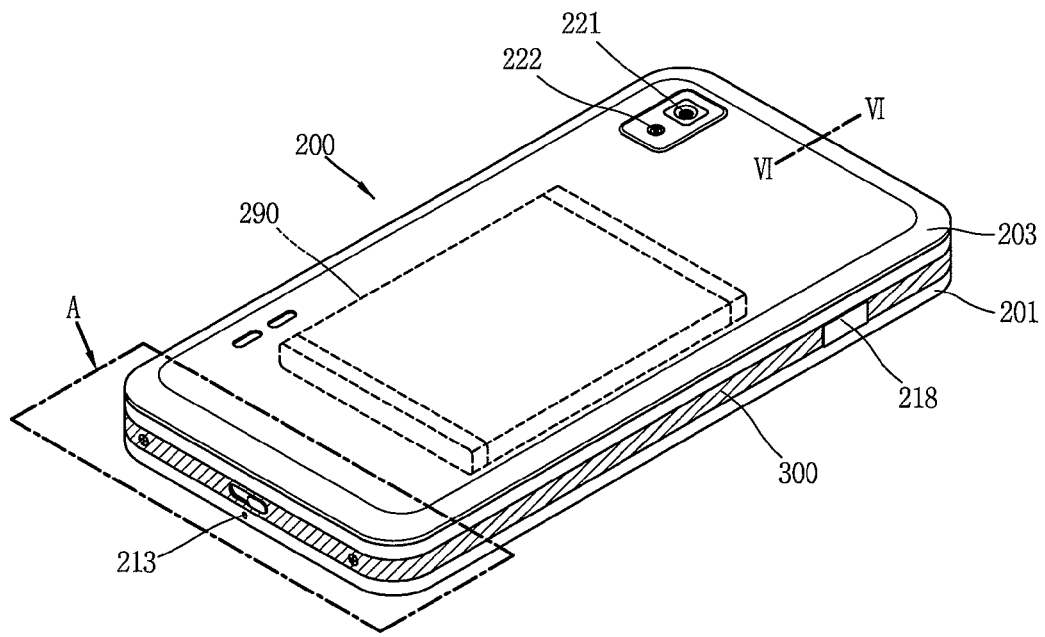
FIG. 3 is a rear perspective view of the mobile terminal of FIG. 2.
Figure 4:
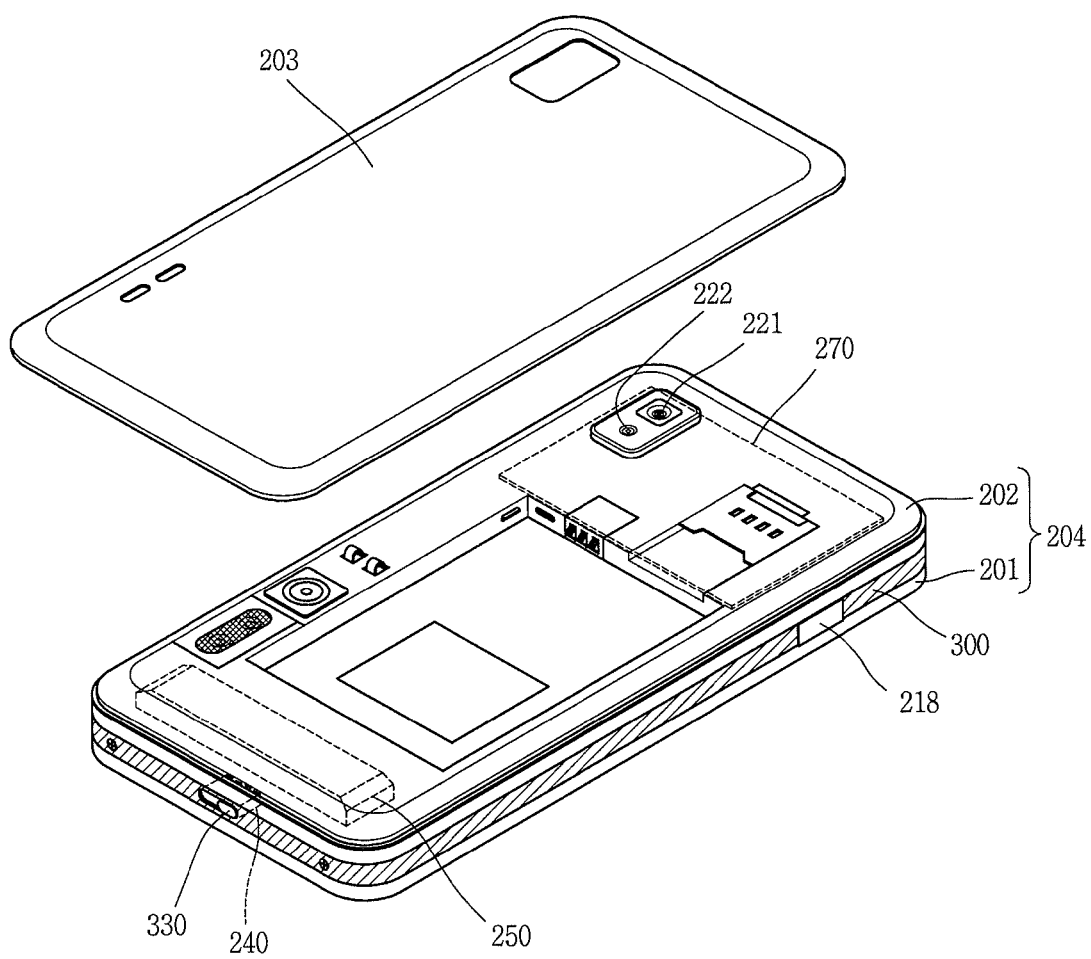
FIG. 4 is a perspective view showing a state where a battery case has been removed from the mobile terminal of FIG. 3.

FIG. 2 is a front perspective view of a mobile terminal according to the present invention, and FIG. 3 is a rear perspective view of the mobile terminal of FIG. 2. FIG. 4 is a perspective view showing a state where a battery case has been removed from the mobile terminal of FIG. 3.

Referring to FIGS. 2, 3 and 4, the mobile terminal 200 according to the present invention is provided with a bar type terminal body. However, the present invention is not limited to this, but may be applied to a slide type in which two or more bodies are coupled to each other so as to perform a relative motion, a folder type, a swing type, and the like. Further, the mobile terminal of the present invention may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The mobile terminal 200 includes a terminal body 204 which forms the appearance thereof.

A case (casing, housing, cover, etc.) which forms the appearance of the terminal body 204 may include a front case 201, a rear case 202, and a battery cover 203 for covering the rear surface of the rear case 202.

A space formed by the front case 201 and the rear case 202 may accommodate various components therein. Such cases may be formed by injection-molded synthetic resin, or may be formed using a metallic material such as stainless steel (STS) or titanium (Ti).

On the front surface of the terminal body 204, may be disposed a display 210, a first audio output unit 211, a front camera 216, a signal input module 214, an interface unit 215, and a user input unit 217.

The display 210 includes a liquid crystal display (LCD) module, organic light emitting diodes (OLED) module, e-paper, etc., each for visually displaying information. The display 210 may include a touch sensing means for inputting information in a touch manner.

The display 210 includes a window 210a (refer to FIG. 8) and a display module 210b. Hereinafter, the window 210a including the touch sensing means is called 'touch screen'. Once part on the touch screen 210a is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 210a occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, acquired by an image sensor in a video call mode or a capturing mode. The processed image frames may be displayed on the display 210.

The image frames processed by the front camera 216 may be stored in the memory 160, or may be transmitted to the outside through the wireless communication unit 110. The front camera 216 may be implemented in two or more according to a user's interface.

The user input unit 217 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 217 may be implemented as a dome switch, or a touch screen, or a touch pad for inputting commands or information in a user's push or touch manner. Alternatively, the user input unit 217 may be implemented, for example, as a wheel for rotating a key, a jog, or a joystick. The user input unit 217 is configured to input various commands such as START, END and SCROLL.

A signal input module 214, an interface unit 215, an audio input unit 213, etc. are disposed on the side surface of the front case 201.

The signal input module 214 may be called 'manipulation unit', and may be configured to receive commands for controlling the operation of the mobile terminal 200. The signal input module 214 may include any type of ones that can be manipulated in a user's tactile manner. Content input by the signal input module 214 may be variously set. For instance, through the side key 214, may be input commands such as controlling the front and rear cameras 216 and 221, controlling the level of sound output from the audio output unit 211, and converting a current mode of the display 210 into a touch recognition mode.

The audio input unit 213 may be implemented as a microphone for receiving a user's voice, other sound, etc.

The interface unit 215 serves a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 290 and the rear camera 221 are disposed on the rear surface of the body.

A flash 222 and a mirror (not shown) may be disposed close to the rear camera 221. When capturing an object by using the rear camera 221, the flash 222 provides light onto the object.

When the user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the terminal body 204 so as to rotate or pop-up.

The power supply unit 290 is configured to supply power to the mobile terminal 200. The power supply unit 290 may be mounted in the terminal body 204, or may be detachably mounted to the terminal body 204.

Figure 5:
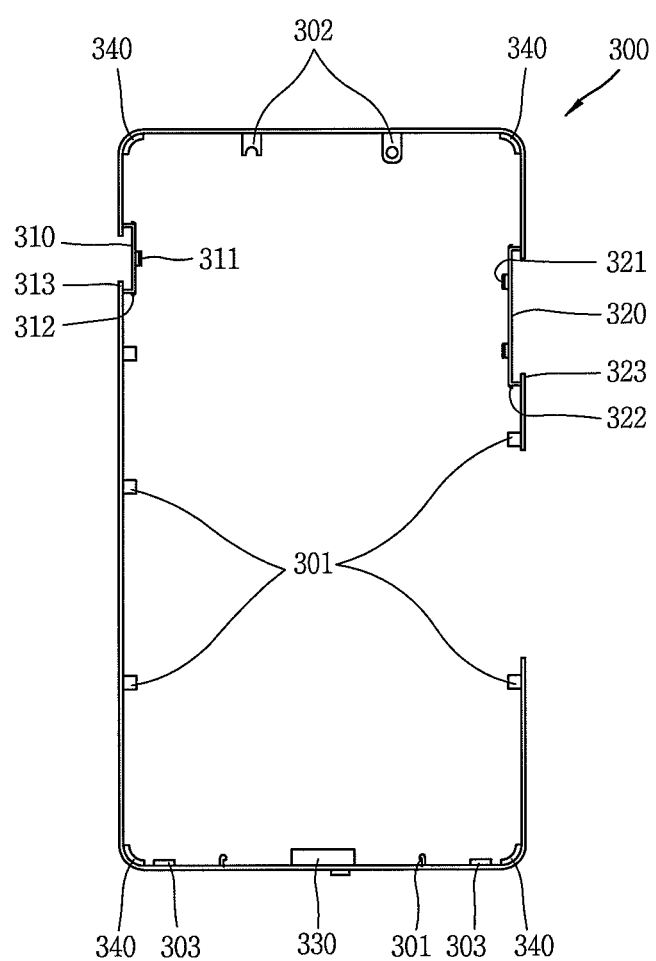
FIG. 5 is a conceptual view of a frame according to an embodiment of the present invention.
Figure 6:
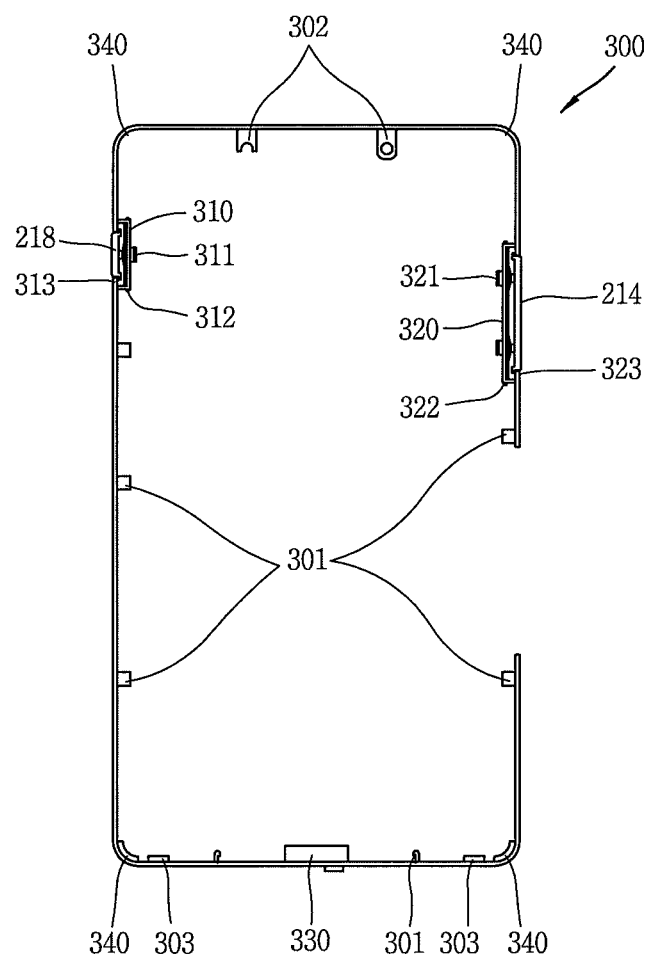
FIG. 6 is a conceptual view showing a state where a signal input module has been coupled to a frame.

FIG. 4 is a perspective view showing a state where a battery case has been removed from the mobile terminal of FIG. 3, FIG. 5 is a conceptual view of a frame according to an embodiment of the present invention, and FIG. 6 is a conceptual view showing a state where a signal input module has been coupled to a frame.

Referring to FIG. 4, a circuit board 270 is formed at an inner space of the terminal body 204, the inner space defined by the front case 201 and the rear case 202. The circuit board 270 may be mounted to the rear case 202, or may be mounted to an additional inner structure. The circuit board 270 may be implemented as an example of the controller for operating various types of functions of the mobile terminal.

An antenna device 250 for radiating radio signals may be disposed at the inner space of the terminal body 204.

A socket 240 electrically connected to the circuit board 270 and connectable to an external device, is disposed at the inner space of the terminal body 204.

The external device inserted into the socket 240 may be implemented as a SIM card. The SIM card indicates a card for storing personal information.

Alternatively, the external device may be implemented as a memory card called a micro SD (e.g., T-flash card), or a modem chip such as a Mobile Station Modem (MSM) chip.

Still alternatively, the external device may be implemented as a charging port such as a Multimedia Interface (MMI) connector, a call earphone port, or a data cable port.

The front case 201 is provided with mounting grooves 201a (refer to FIG. 12B) for mounting a frame 300. The mounting grooves 201a are parts recessed from one surface of the front case 201, which are formed in a lengthwise direction of the front case 201. The mounting grooves 201a are formed in shape corresponding to the frame 300. In the following embodiment, the term of 'case' means the front case 201. However, the mounting grooves 201a may be formed at the front case 201 or the rear case 202. Alternatively, the mounting grooves 201a may be formed at both of the front case 201 and the rear case 202.

The frame 300 is a structure for integrating a power key 218, a signal input module 214 may be in the form of a volume key, a slide door 330, etc. formed on the side surfaces of the mobile terminal, to the frame 300. In the conventional mobile terminal, components associated with functions of the mobile terminal, e.g., a power key 218, a volume key 214, a slide door 330, etc., are formed on the side surfaces of the mobile terminal. Then, the respective components are coupled to the front case 201, respectively. Under such conventional structure, the front case 201 requires an additional space for maintaining a gap between the components and the front case 201. For assembly, the front case 201 should be provided with an additional coupling structure with respect to each component. Besides, it takes a lot of time to perform the assembly process, because the respective components should be coupled to the front case 201.

In order to solve such problems, the respective components formed on the side surfaces of the terminal body 204 are integrated with the frame 300. Then, the frame 300 integrated with the components is coupled to the front case 201.

The frame 300 may be configured to cover only one side surface of the mobile terminal. Alternatively, the frame 300 may be configured to cover at least two side surfaces of the mobile terminal. Here, the two side surfaces may be an upper surface of the terminal body 204, and a side surface adjacent to the upper surface. Still alternatively, the frame 300 may be configured to cover all of upper, lower, right and left surfaces of the terminal body 204. As shown in FIG. 5, the frame 300 may be configured to cover all the side surfaces in a state where a specific part is open. That is, the frame 300 may have a structure for covering one side surface of the terminal body 204, or a consecutive structure for covering at least two side surfaces of the terminal body 204.

The frame 300 may be coupled to the front case 201 or the rear case 202. A hook may be engaged to a locking portion formed at the front case 201 or the rear case 202.

At least part of the frame 300 may be inserted into the mounting grooves 201a of the front case 201. Under such configuration, the frame 300 and the front case 201 are integrated with each other, and the integrated frame 300 and front case 201 forms the appearance of the terminal body 204.

Referring to FIGS. 5 and 6, a plurality of hooks 301, 311 and 321 may be formed at the frame 300. Locking portions 201a and 201b (refer to FIGS. 8 and 12B, respectively) corresponding to the hooks 301, 311 and 321 may be formed at the mounting grooves 201a of the front case 201. As the hooks 301, 311 and 321 are engaged with the locking portions 201b and 202a, the frame 300 and the front case 201 may be coupled to each other.

Alternatively, the hooks may be formed at the mounting grooves 201a toward the front case 201 and the locking portions may be formed at the frame 300 in correspondence to the hooks.

The frame 300 may be provided with a screw hole 302 as a fixing structure, which will be later explained with reference to FIG. 10.

The hooks 301, 311 and 321, and the screw hole 302 of the frame 300 correspond to a fixing portion.

As shown in FIG. 6, signal input modules 214 and 218 are coupled to the frame 300. Then, the frame 300, having the signal input modules 214 and 218 coupled thereto, is coupled to the front case 201. The signal input modules 214 and 218 may include a sound control key module 214, and a power key module 218. The power key module 218 may be coupled to one side of the frame 300, and the sound control key module 214 may be coupled to another side of the frame 300. At a lower end of the frame 300, may be formed a slot portion 331 (refer to FIG. 11) communicated with a socket 240, and a slide door 330 for opening or closing the slot portion 331.

One of the front case 201 and the frame 300 may be formed of a conductive member, and another may be formed of a non-conductive member. As an example, the frame 300 may be formed of a conductive member, and the front case 201 may be formed of a non-conductive member. Under such configuration, the frame 300 may operate as a radiator of an antenna.

The frame 300 formed of a conductive member may operate as a radiator for radiating electric waves, in a monopole type antenna, a PIFA type antenna, a folded dipole type antenna, or a slot type antenna. According to an antenna type, the frame 300 may be feed-connected, or may be feed-connected and ground-connected. In case of a slot antenna, the frame 300 may have a slot, and the slot may be ground.

In a case where the frame 300 operates as a radiator of an antenna, the frame 300 may be formed to have an electric length corresponding to the frequency of radio signals transceived (transmitted and received) through the antenna. More specifically, if the frame 300 operates as a radiator of a monopole type antenna or a PIFA type antenna, the frame 300 may be formed to have an electric length corresponding to $\lambda/4$ or $\lambda/8$ of the central frequency in a corresponding frequency band. The frame 300 may be feed-connected or ground-connected to a circuit board of the antenna.

One of the front case 201 and the frame 300 may be formed of metallic material, and another may be formed of synthetic resin. For instance, the frame 300 may be formed of metallic material, and the front case 201 may be formed of synthetic resin. Under such configuration, the frame 300 may enhance the strength of the front case 201.

The frame 300 may be provided with a buffer 340 for absorbing an impact applied to the front case 201. That is, the buffer 340 may be formed at part of the frame 300 configured to cover the edge of the front case 201. The buffer 340 is formed of elastic material such as rubber. As the frame 300 is provided with the buffer 340, an impact applied to the mobile terminal when the mobile terminal falls down may be absorbed.

Figure 7:
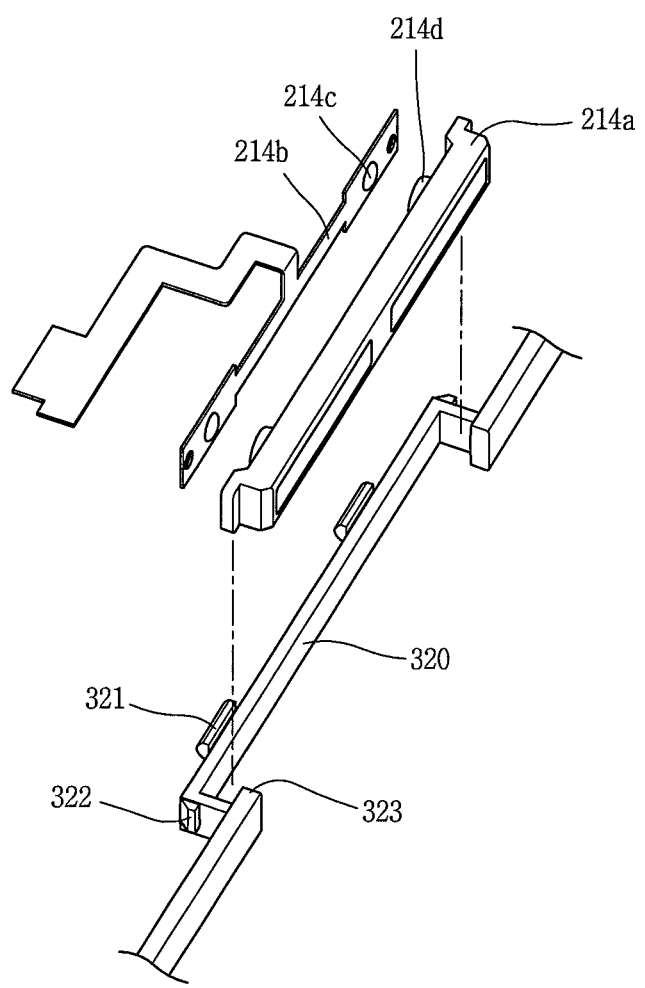
FIG. 7 is a conceptual view of a key and a flexible printed circuit board of a signal input module.

FIG. 7 is a conceptual view of a key 214a and a flexible printed circuit board 214b of the signal input module 214. FIG. 7 illustrates the key 214a and the flexible printed circuit board 214b as components of the signal input module 214.

One surface of the key 214a is exposed to the outside through an opening of the frame 300, and actuators 214d are formed on a rear surface of the key 214a. The actuators 214d are configured to press domes 214c attached to the FPCB 214b. The domes 214c are formed on one surface of the FPCB 214b. Contact points are formed on one surface of the FPCB 214b covered by the domes 214c. The contact points may include a first contact point and a second contact point. The second point may be formed on one surface of the FPCB 214b contacting the end of the dome 214c, and the first point may be formed on one surface of the FPCB 214b covered by a central part of the dome 214c.

Once a user presses the key 214a, the actuators 214d press the domes 214c, and the contact points of the FPCB 214b are connected to each other through the domes 214c. As a result, a signal is generated.

The generated signal is transmitted to the circuit board 270 disposed in the mobile terminal connected to the FPCB 214b. Then, the controller of the mobile terminal controls a corresponding component to perform a preset operation, based on the received signal. For instance, the controller controls a speaker or a display to output a sound or to output a specific image according to a command.

Protrusions are formed on two side surfaces of the key 214a. The protrusions are formed to contact accommodation portions 310 and 320 of the frame 300. The accommodation portions 310 and 320 contacting the protrusions may include coupling members 313 and 323 formed to have a shape corresponding to the protrusions. For instance, the coupling members 313 and 323 may be provided with grooves corresponding to the protrusions. Under such configuration, the key 214a can operate without being separated from the frame 300, when pressed or touched.

Protrusions 312 and 322 may be also formed on at least two side surfaces of the accommodation portions 310 and 320. The protrusions may be coupled to another coupling means formed at the mounting groove of the case.

Figure 8:
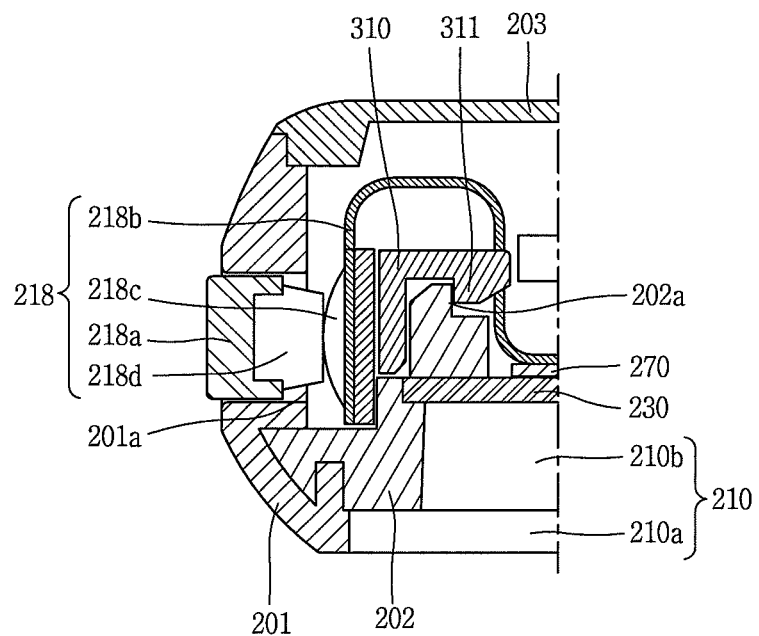
FIG. 8 is a sectional view taken along line 'IV-IV' in FIG. 2.
Figure 9:
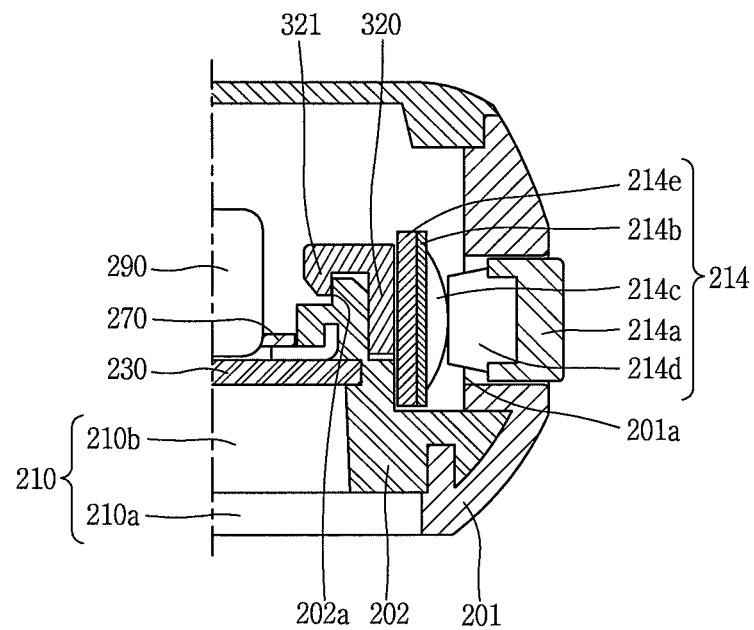
FIG. 9 is a sectional view taken along line 'V-V' in FIG. 2.

FIG. 8 is a sectional view taken along line 'IV-IV' in FIG. 2, and FIG. 9 is a sectional view taken along line 'V-V' in FIG. 2. FIG. 8 illustrates that a power key has been coupled to the frame 300 as the signal input module 218, and FIG. 9 illustrates that a sound control key has been coupled to the frame 300 as the signal input module 214.

Referring to FIGS. 5, 8 and 9, the frame 300 is provided with accommodation portions 310 and 320 for accommodating the signal input modules 214 and 218 therein. The accommodation portions 310 and 320 are parts inward recessed from the frame 300. The hooks 311 and 321 may be formed on the inner side surfaces of the accommodation portions 310 and 320. Such hooks 301, 311 and 321 may be coupled to the locking portions 201b and 202a of the front case 201. Since the mounting grooves 201a of the front case 201 are provided with the locking portions 201b and 202a, the accommodation portions 310 and 320 may be coupled to the mounting grooves 201a. That is, the inner side surfaces of the accommodation portions 310 and 320 are supported by the mounting grooves 201a, and are coupled to the mounting grooves 201a. Since the signal input modules 214 and 218 of FIG. 8 are frequently pressed or touched by a user, they should be more stably supported at the front case 201. Accordingly, as aforementioned, the accommodation portions 310 and 320 for accommodating the signal input modules 214 and 218 may support the signal input modules 214 and 218, and may be coupled to the mounting grooves 201a more stably.

The accommodation portions may be configured to enclose the signal input modules. Here, the accommodation portions may be provided with holes for accommodating the signal input modules.

Referring to FIGS. 7 and 8, the flexible printed circuit board (FPCB) 214b and 218b are connected to the circuit board 270 mounted in the terminal body 204. This can allow signals generated from the signal input modules 214 and 218 to be transferred to the circuit board 270. The FPCB 214b may be supported by one surface of the accommodation portions 310 and 320. The FPCB 214b and the accommodation portions 310 and 320 may be coupled to each other by an adhesive means such as a double-sided tape. Alternatively, the FPCB 214b and the accommodation portions 310 and 320 may be coupled to each other by a coupling means such as screws. As shown in FIG. 8, the FPCB 214b is bent so that one surface thereof can face the actuators 214d.

Referring to FIG. 9, the signal input module 214 may include a supporting member 214e. One surface of the supporting member 214e contacts the FPCB 214b so as to support the FPCB 214b, and another surface of the supporting member 214e contacts the accommodation portions 310 and 320 (See FIG. 6). Referring to FIGS. 9 and 6, said another surface of the supporting member 214e may be coupled to the accommodation portions 310 and 320 by an adhesive member or a coupling member.

Figure 10:
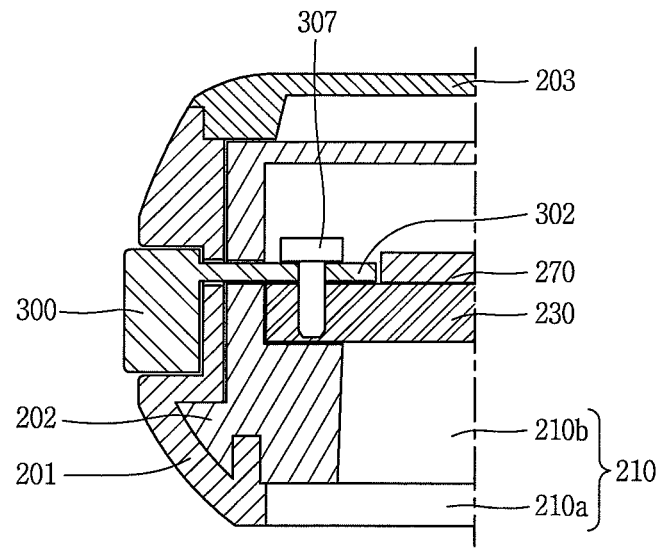
FIG. 10 is a sectional view taken along line 'VI-VI' in FIG. 3, which shows a state where a frame has been coupled to a supporting plate.
Figure 11:
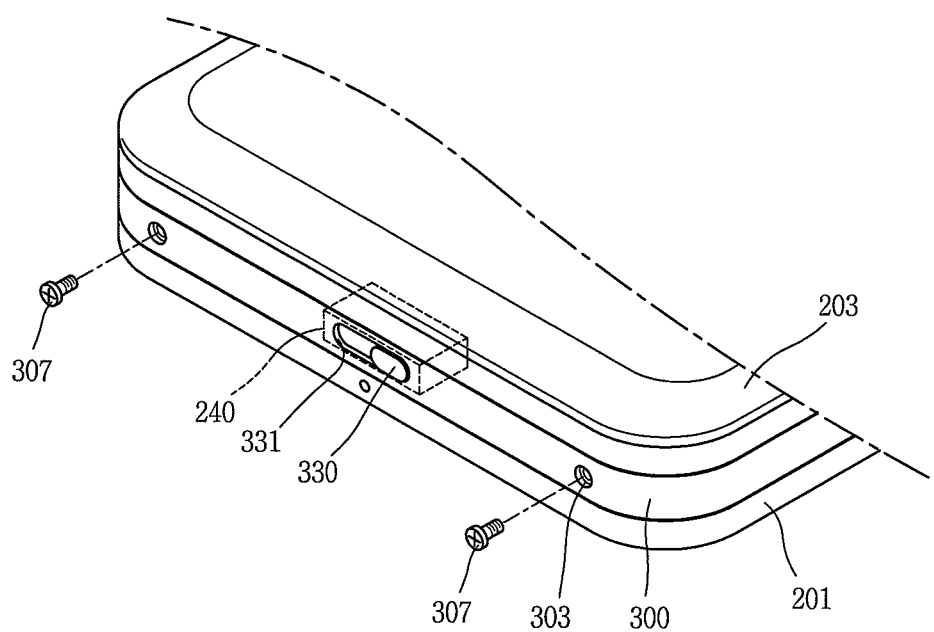
FIG. 11 is an enlarged view of part 'A' in FIG. 3, which shows a state where a frame has been coupled to a rear case.

FIG. 10 is a sectional view taken along line 'VI-VI' in FIG. 3, which shows a state where the frame 300 has been coupled to a supporting plate. FIG. 11 is an enlarged view of part 'A' in FIG. 3, which shows a state where the frame 300 has been coupled to the rear case 202.

As shown in FIG. 10, the frame 300 may be fixed to a supporting plate 230 for supporting the inside of the mobile terminal. To this end, the frame 300 is provided with a screw hole 302. The screw hole 302 is formed to inward protrude from the frame 300, and to contact the supporting plate 230. The supporting plate 230 is provided with a hole. In a state where the hole of the supporting plate 230 is communicated with the screw hole of the frame 300, a screw 307 passes through the hole of the supporting plate 230 and the screw hole of the frame 300, so that the supporting plate 230 and the frame 300 are coupled to each other. Under such configuration, the frame 300 can be fixed not only to the case, but also to the supporting plate 230. That is, the frame 300 can be more stably fixed. In a case where the frame 300 and the supporting plate 230 are formed of conductive members, static electricity inside the mobile terminal may be discharged to the outside.

A display module 210b may be disposed on one surface of the supporting plate 230, and the circuit board 270 may be disposed on another surface of the supporting plate 230. A battery mounting portion 265 for mounting the battery 290 may be formed at the supporting plate 230.

Referring to FIG. 11, the frame 300 may be provided with through holes 303. In correspondence to the through holes 303, the front case 201 may be provided with holes. The screws 307 may couple the frame 300 and the front case 201 to each other, by passing through the through holes and the holes. The socket 240 may be formed on the bottom surface of the terminal body 204. The frame 300 may be provided with a slide door 330 for opening or closing the socket 240. When the slide door 330 is open or closed, force may be applied to the frame 300. By the applied force, the frame 300 may be separated from the front case 201. In order to prevent such separation, the through holes are formed near the frame 300 having the slide door 330 coupled thereto, and the front case 201 and the frame 300 are coupled to each other by the screws 307. This can enhance a coupling force between the front case 201 and the frame 300.

When an external device is inserted into the socket 240, force may be applied to the front case 201 through the external device. If the front case 201 and the frame 300 are coupled to each other by the screws 307, a coupling force between the front case 201 and the frame 300 is increased to disperse the force applied to the front case 201.

FIGS. 12A to 12D are views showing an example of fabricating a mobile terminal according to an exemplary embodiment of the present invention.

Figure 12A:
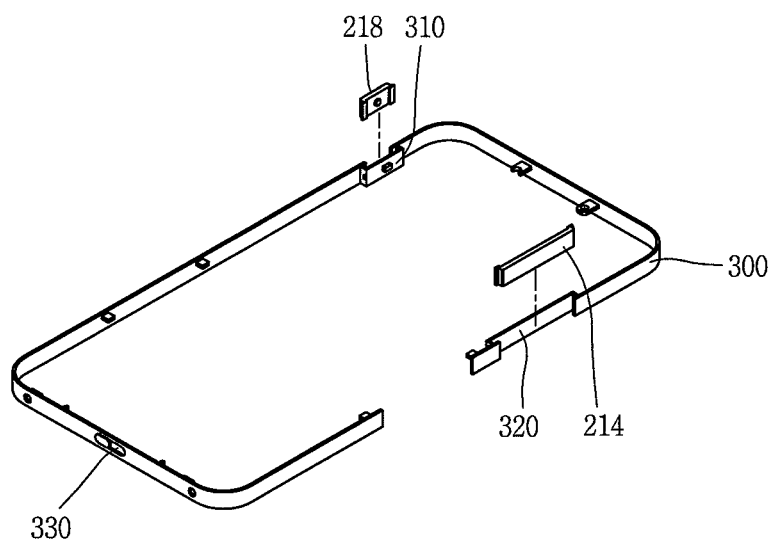
FIGS. 12A to 12D are views showing an example of fabricating a mobile terminal according to an embodiment of the present invention.
Figure 12B:
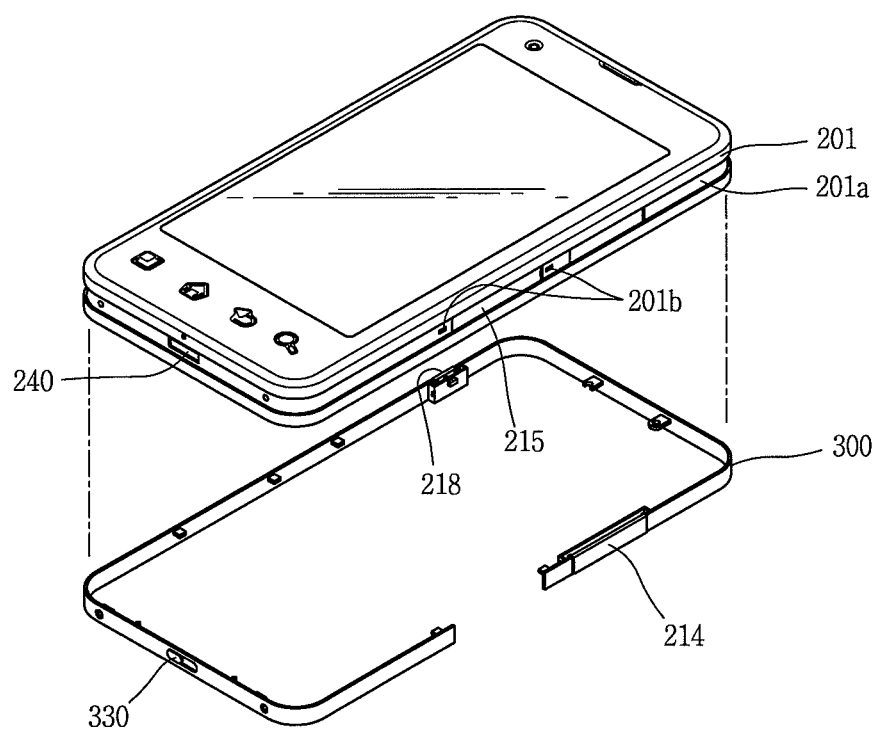

Firstly, a frame 300 is formed. Then, the frame 300 is processed so as to be inserted into mounting grooves 201a of a front case 201. Such processing may be performed so as to polish part of the frame 300, so that an unnecessary protrusion can have a smooth surface. As shown in FIG. 12A, signal input modules 214 and 218 rather than an FPCB 214b are coupled to accommodation portions 310 and 320 of the fame 300.

Then, the frame 300, having the signal input modules 214 and 218 coupled thereto, is coupled to the front case 201. In a case where the frame 300 is provided with a slide door 330, the slide door 330 is disposed to cover a slot of a terminal body 204. The frame 300 is inserted into the mounting grooves 201a formed on the side surfaces of the front case 201, so that hooks 301, 311 and 321 of the front case 201 can be engaged with locking portions 201b and 202a of the mounting grooves 201a. In a case where the frame 300 is provided with a through hole or a screw hole 302, the frame 300 may be coupled to a rear case 202 or a supporting plate 230 using screws 307.

Figure 12C:
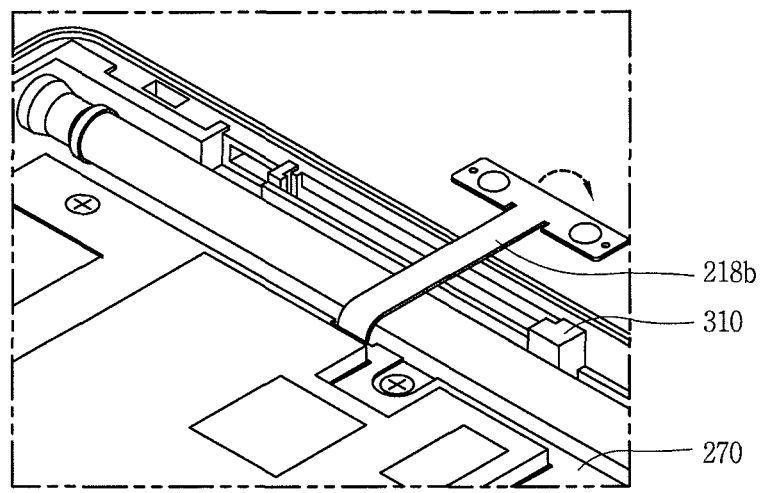
Figure 12D:
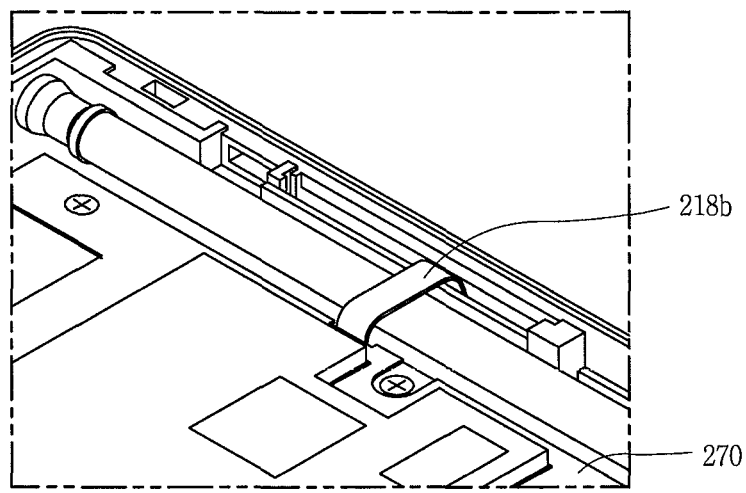

Then, one end of the FPCB 214b is coupled to a circuit board mounted to the terminal body 204, and another end of the FPCB 214b is bent to be inserted into the accommodation portions 310 and 320 as shown in FIGS. 12C and 12D. The FPCB 214b disposed between a key 214a and the accommodation portions 310 and 320 may be coupled to the accommodation portions 310 and 320. In a case where a supporting member 214e for supporting the FPCB 214b is disposed between the accommodation portions 310 and 320 and the FPCB 214b, the FPCB 214b may be coupled to the supporting member 214e.

In the exemplary embodiment of the present invention, the signal input modules 214 and 218 are coupled to the frame 300, and the frame 300 having the signal input modules 214 and 218 coupled thereto is coupled to the front case 201. Under such configuration, components formed on the side surfaces of the terminal body can be integrated with the frame 300, thereby simplifying the assembly processes.

Further, the signal input modules 214 and 218, or the slide door 330 is modularized with the frame 300. Under such configuration, components can be more freely arranged at an inner space of the mobile terminal, and the mobile terminal can have a more compact structure.

Figure 13:
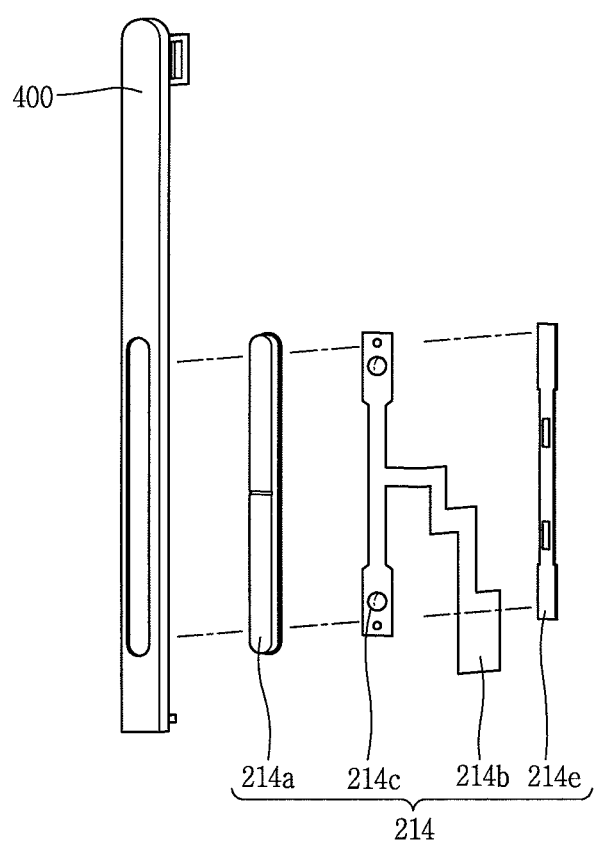
FIG. 13 is a conceptual view showing a frame and a signal input module according to another embodiment of the present invention.
Figure 14:
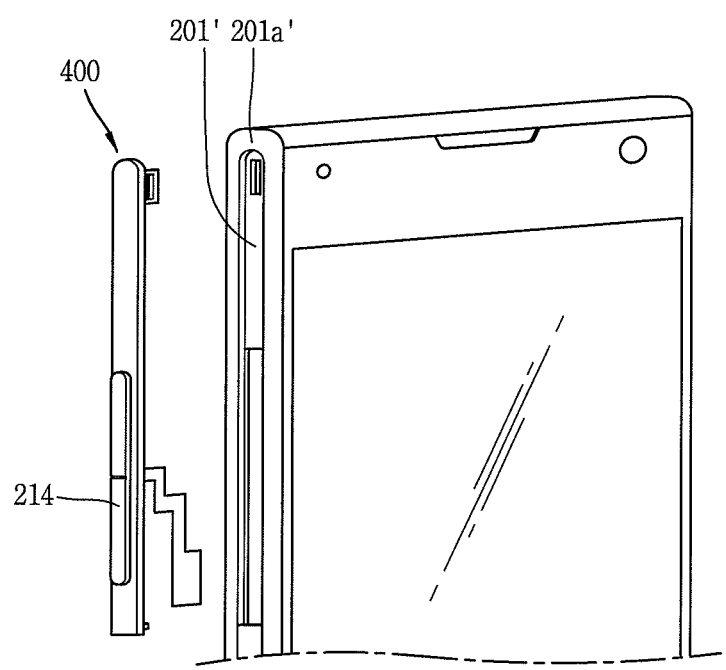
FIG. 14 is a conceptual view showing a state where a case and a signal input module have been coupled to a frame.

FIG. 13 is a conceptual view showing a frame 400 and a signal input module 214 according to another embodiment of the present invention, and FIG. 14 is a conceptual view showing a state where a front case 201 and a signal input module 214 have been coupled to the frame 400.

In this embodiment, the signal input module 214 includes a key 214a, a flexible printed circuit board (FPCB) 214b, and a supporting member 214e for supporting the FPCB 214b. The key 214a, the FPCB 214b and the supporting member 214e are assembled with each other, and then are coupled to the frame 400.

Unlike in the aforementioned embodiment, the signal input module 214 is integrated with the frame 400, and then the frame 400 having the signal input module 214 is coupled to the terminal body 204.

That is, in the aforementioned embodiment, the frame 300 and the front case 201 are coupled to each other. Then, the FPCB 214b of the signal input modules 214 and 218 is inserted into the accommodation portions 310 and 320. On the other hand, in this embodiment, the signal input module 214 including the FPCB 214b is integrated with the frame 400. Then, the integrated frame 400 is coupled to mounting grooves 201a' of a front case 201'.

This embodiment is similar to the aforementioned embodiment in the rest configurations, and thus its detailed explanations will be omitted.

In the present invention, the signal input module is coupled to the frame. Then, the frames 300 and 400 having the signal input modules 214 and 218 coupled thereto are coupled to the cases 201 and 201'. Under such configuration, the respective components formed on the side surfaces of the terminal body 204 can be integrated with the frames 300 and 400. This can simplify the assembly processes.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body;
a case defining an appearance of a terminal body of the mobile terminal, the case having a front case including front and side surfaces and a rear case connected to the front case;
a display unit disposed on the front surface of the front case;
a mounting groove formed on the side surface of the front case, the mounting groove being recessed from a portion of the side surface of the front case, and the mounting groove extending along the side surface;

a circuit board disposed in the terminal body;

a frame disposed in the mounting groove, the frame having at least one accommodation portion, one side of the frame defining a portion of the appearance of the terminal body; and at least one signal input module disposed in the at least one accommodation portion, the at least one signal input module having a key exposed outside of the case, a flexible printing circuit board being connected to the circuit board, and an actuator facing the flexible printing circuit board, wherein the frame is formed of a conductive member and is configured to operate as a radiator of an antenna, wherein the frame has an opening portion corresponding to a remaining portion of the side surface, a plurality of hooks protruded from another side of the frame for engaging the front case, wherein an interface unit is disposed on the remaining portion and exposed from the frame;

wherein the front case has a plurality of locking portions engaged with the plurality of hooks, wherein the one side of the flexible printing circuit board is attached to a part of the frame corresponding to the accommodation portion, and wherein the key has opposite ends, each end having a protrusion, and the accommodation portion includes coupling members having a shape corresponding to the protrusions formed at the opposite ends of the key, the coupling members being configured to be engaged with the protrusions.

2. The mobile terminal of claim 1, wherein the accommodation portion is coupled to the mounting groove to be supported by the mounting groove.

3. The mobile terminal of claim 2, wherein the flexible printed circuit board has a dome on one surface thereof, the dome being configured to generate a signal as the key is pressed.

4. The mobile terminal of claim 3, wherein the signal input module further includes a supporting member having a first surface to support the flexible printed circuit board and a second surface to contact the accommodation portion.

5. The mobile terminal of claim 1, wherein the frame is configured to cover at least two side surfaces of the terminal body, the at least two side surfaces being selected from an upper side surface, a lower side surface, a left side surface and a right side surface, and wherein the frame is formed as a continuous member to cover the at least two side surfaces of the terminal body.

6. The mobile terminal of claim 5, wherein the terminal body includes a socket configured to be connectable to an external device, the socket being located within the terminal body, and wherein the frame includes a slot portion in communication with the socket.

7. The mobile terminal of claim 6, wherein the frame further includes a slide door coupled to the slot portion, the slide door being movable to open and close the socket.

8. The mobile terminal of claim 1, wherein the terminal body includes a support frame located between the front frame and the rear frame, and wherein the frame is coupled to the supporting plate via a screw passing through the frame.

9. The mobile terminal of claim 1, wherein the frame and the signal input module are assembled to each other to provide a unitary assembly, and then the unitary assembly is coupled to the case.

10. The mobile terminal of claim 1, wherein one of the case and the frame is formed of a conductive member and the other of the case and the frame is formed of a non-conductive member.

11. The mobile terminal of claim 1, further comprising a buffer formed on at least part of the frame, the buffer being located between the frame and the case.

12. The mobile terminal of claim 1, wherein the at least one signal input module includes two signal input modules located at different side surfaces of the terminal body.

13. The mobile terminal of claim 12, wherein the frame includes two accommodation portions, each accommodation portion being configured to receive one of the two signal input modules therein, the accommodation portions being coupled to the mounting groove to be supported by the mounting groove.

* * * * *